United States Patent
Prasad et al.

(10) Patent No.: US 10,855,447 B2
(45) Date of Patent: Dec. 1, 2020

(54) REQUEST APPROVAL USING BLOCKCHAIN TECHNOLOGY

(71) Applicant: EMC IP Holding Company LLC, Hopkinton, MA (US)

(72) Inventors: Parmeshwr Prasad, Bangalore (IN); Shishir Choubey, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 143 days.

(21) Appl. No.: 16/174,638

(22) Filed: Oct. 30, 2018

(65) Prior Publication Data

US 2020/0136803 A1  Apr. 30, 2020

(51) Int. Cl.
*H04L 29/06* (2006.01)
*H04L 9/06* (2006.01)
*H04L 9/32* (2006.01)

(52) U.S. Cl.
CPC .......... *H04L 9/0637* (2013.01); *H04L 9/0643* (2013.01); *H04L 9/3213* (2013.01); *H04L 2209/38* (2013.01)

(58) Field of Classification Search
CPC . H04L 9/0637; H04L 9/3213; H04L 2209/38; H04L 63/08; H04L 63/0807
See application file for complete search history.

(56) References Cited

U.S. PATENT DOCUMENTS

| | | | |
|---|---|---|---|
| 9,849,364 B2 * | 12/2017 | Tran | H04L 67/12 |
| 10,068,397 B2 | 9/2018 | Day et al. | |
| 10,102,265 B1 * | 10/2018 | Madisetti | G06Q 20/0658 |
| 10,102,526 B1 * | 10/2018 | Madisetti | H04L 9/3239 |
| 10,298,395 B1 * | 5/2019 | Schiatti | H04L 9/3239 |
| 10,438,170 B2 * | 10/2019 | Kozloski | G06Q 10/101 |
| 10,594,488 B2 * | 3/2020 | Lancashire | H04L 9/3236 |
| 2018/0115426 A1 | 4/2018 | Andrade et al. | |
| 2018/0144565 A1 | 5/2018 | Day et al. | |
| 2018/0248699 A1 | 8/2018 | Andrade | |

* cited by examiner

*Primary Examiner* — Hosuk Song
(74) *Attorney, Agent, or Firm* — Ryan, Mason & Lewis, LLP

(57) ABSTRACT

Methods, apparatus, and processor-readable storage media for request approval using blockchain technology are provided herein. An example computer-implemented method includes initiating creation of a blockchain network comprising multiple devices corresponding to required sub-requests configured for a particular request for approval transaction; implementing, at a given one of the devices, a distinct block in the blockchain network, wherein the block comprises cryptographic information pertaining to the particular request for approval transaction, a decision value for one or more of the sub-requests, and a count of the cryptographic tokens remaining in the blockchain network; broadcasting, from the given device to the remaining devices, information pertaining to the block; removing at least one cryptographic tokens from the blockchain network in response to each implemented block that corresponds to approval of a required sub-request; and granting the particular request in response to removal of all of the cryptographic tokens from the blockchain network.

20 Claims, 5 Drawing Sheets

REQUEST APPROVAL USING BLOCKCHAIN TECHNOLOGY

FIELD

The field relates generally to information processing systems, and more particularly to techniques for providing security for transactions using such systems.

BACKGROUND

Approval requests for access, authorizations, etc. are commonly sought and/or required in various company and other enterprise-related contexts. Certain existing request approval arrangements face efficiency challenges, as they depend on human availability and/or bandwidth. Additionally, other existing request approval arrangements, such as hierarchy-based approval techniques, can create increased overhead and delays. Further, other existing arrangements utilize and/or rely upon approvers that may not be trusted by the network in question, creating potential security vulnerabilities.

SUMMARY

Illustrative embodiments of the invention provide techniques for request approval using blockchain technology. An exemplary computer-implemented method can include initiating creation of a blockchain network comprising multiple devices corresponding to multiple required sub-requests configured for a particular request for approval transaction, wherein the blockchain network further comprises multiple cryptographic tokens corresponding to the multiple devices. Such a method can also include implementing, at a given one of the multiple devices, a distinct block in the blockchain network, wherein the implemented block comprises cryptographic information pertaining to the particular request for approval transaction, a decision value for one or more of the required sub-requests, and a count of the cryptographic tokens remaining in the blockchain network. Further, such a method can include broadcasting, from the given device to the remaining devices within the blockchain network, information pertaining to the implemented block, removing at least one of the cryptographic tokens from the blockchain network in response to each implemented block that corresponds to approval of a required sub-request, and granting the particular request for approval transaction in response to removal of all of the cryptographic tokens from the blockchain network.

Illustrative embodiments can provide significant advantages relative to conventional request approval arrangements. For example, challenges associated with bottlenecks and inefficiencies are overcome through the creation and implementation of a private blockchain network including all approvers required for a given request approval transaction. Such a blockchain network implementation provides a token mechanism to fulfill approval processes, and precludes a requirement that approvers authenticate in an identity governance and lifecycle system to prove identity.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
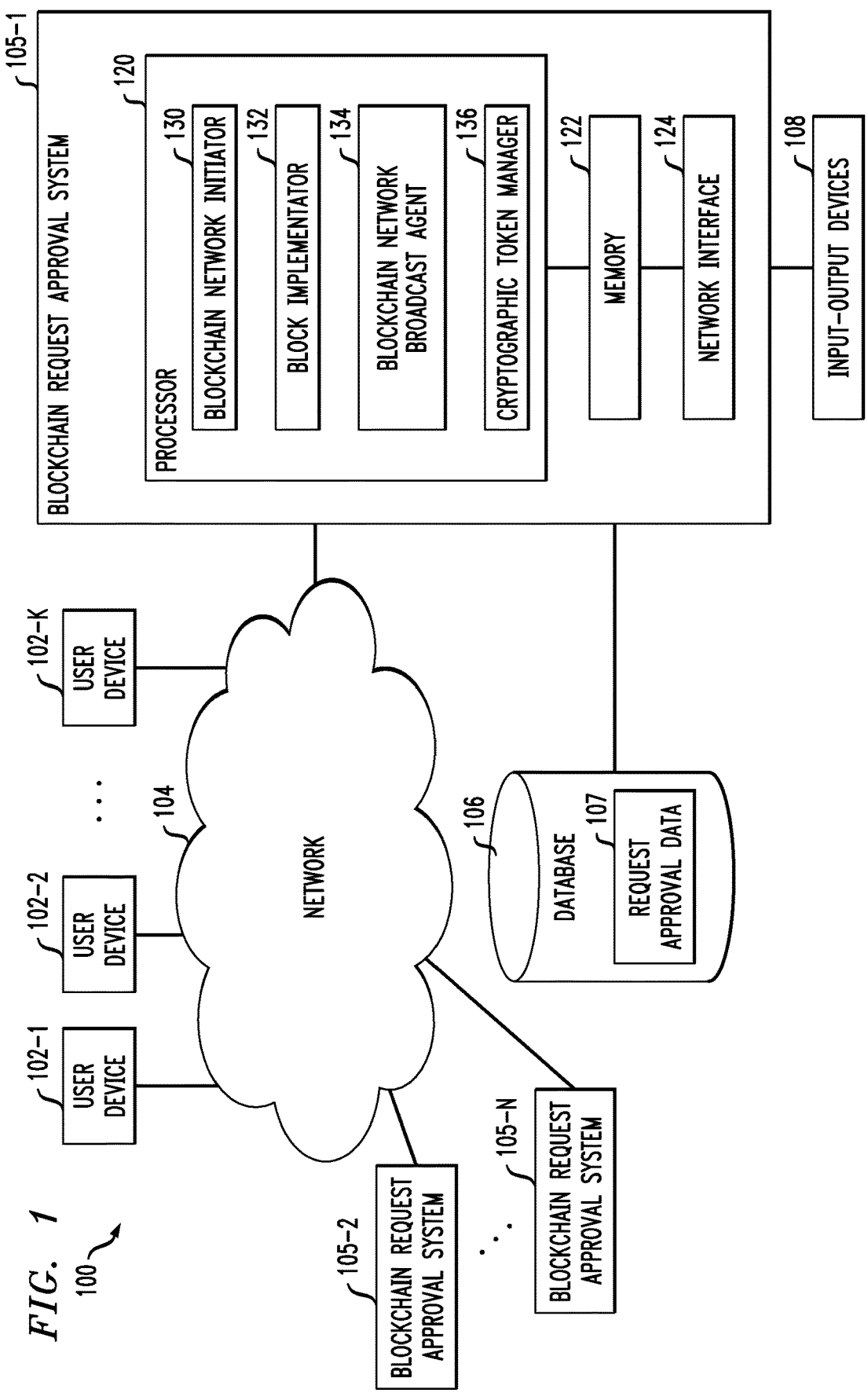
FIG. 1 shows an information processing system configured for request approval using blockchain technology in an illustrative embodiment of the invention.

FIG. 1 shows a computer network (also referred to herein as an information processing system) 100 configured in accordance with an illustrative embodiment of the invention. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. By way of specific example, in one or more embodiments of the invention, network 104 comprises a blockchain network. Accordingly, elements 100 and 104 are both referred to herein as examples of "networks" but the latter is assumed to be a component of the former in the context of the FIG. 1 embodiment. Also coupled to the network 104 are blockchain request approval systems 105-1, 105-2, . . . 105-N, collectively referred to herein as blockchain request approval systems 105. In one or more embodiments of the invention, such blockchain request approval systems 105 comprise devices cooperating via a consensus protocol over a blockchain network.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Each blockchain request approval system 105 also includes an associated database 106 (resident on/in or separately connected thereto) configured to store request approval data 107 that can include user information, approval transaction information, cryptographic information used in connection with the blockchain network, etc.

The database 106 in the present embodiment is implemented using one or more storage systems associated with each blockchain request approval system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with each blockchain request approval system 105 are input-output devices 108, which illustratively comprise keyboards, displays or other types of input-output devices in any combination. Such input-output devices are used to support one or more user interfaces to each blockchain request approval system 105, as well as to support communication between the blockchain request approval system 105 and other related systems and devices not explicitly shown.

The blockchain request approval systems 105 in the FIG. 1 embodiment are assumed to be implemented using at least one processing device. Each such processing device generally comprises at least one processor and an associated memory, and implements one or more functional modules for controlling certain features of the blockchain request approval systems 105.

More particularly, the blockchain request approval systems 105 in this embodiment comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the invention include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows each blockchain request approval system 105 to communicate over the network 104 with the user devices 102, and illustratively comprises one or more conventional transceivers.

The processor 120 further comprises a blockchain network initiator 130, a block implementer 132, a blockchain network broadcast agent 134 and a cryptographic token manager 136.

It is to be appreciated that this particular arrangement of modules 130, 132, 134 and 136 illustrated in the processor 120 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the blockchain network initiator 130, block implementer 132, blockchain network broadcast agent 134 and cryptographic token manager 136 may be implemented at least in part in the form of software that is stored in memory 122 and executed by processor 120.

It is to be understood that the particular set of elements shown in FIG. 1 for request approval using blockchain technology involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the blockchain request approval systems 105 can be eliminated and associated elements such as blockchain network initiator 130, block implementer 132, blockchain network broadcast agent 134 and cryptographic token manager 136 can be implemented elsewhere in the computer network 100.

An exemplary process utilizing blockchain network initiator 130, block implementer 132, blockchain network broadcast agent 134 and cryptographic token manager 136 of the blockchain request approval systems 105 in computer network 100 will be described in more detail with reference to the flow diagram of FIG. 4.

At least one embodiment of the invention includes removing central authority from request approval transactions and rendering each approval transaction independent with increased security features. One such example embodiment includes creating a private blockchain network, wherein all the approvers, represented by devices, will be a part of the blockchain network and will hold a valid and active blockchain account. In at least one embodiment of the invention, these devices are associated with the above-noted accounts, and the devices (which can be blockchain request approval systems 105) cooperate via a consensus protocol over the blockchain network. Such devices utilize blockchain principles of security and decentralization to create trust between the different devices (approvers). Additionally, in one or more embodiments of the invention, the blockchain network can grow and shrink based on the number of approvers added or deleted for a given approval request transaction.

In an example embodiment of the invention, a device corresponding to an administrative account can function as a genesis node of the private blockchain network, implementing a genesis configuration file with information such as chainID, nonce, parentHash and homesteadBlock with default values. After the genesis account is created, the device corresponding to the administrative account can contact one or more devices associated with peer accounts based on the particular configuration of the blockchain network. Additionally, one or more embodiments of the invention can include allocating required cache and file handler information among the devices of the blockchain network, and modifying current states in the chain data as necessary.

Figure 2:
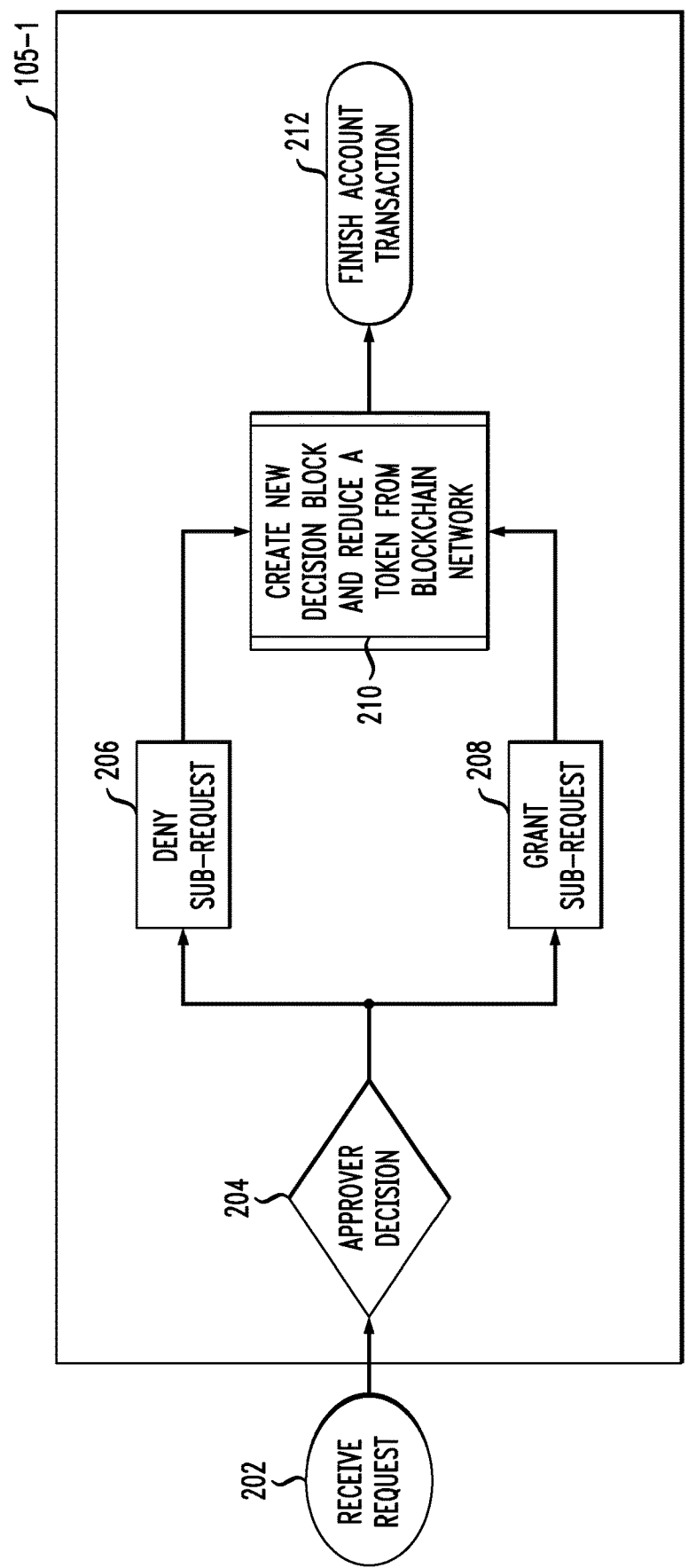
FIG. 2 shows an example individual device decision flow and block creation process in an illustrative embodiment of the invention.

FIG. 2 shows an example individual account decision flow and block creation process in an illustrative embodiment of the invention. By way of illustration, FIG. 2 depicts a request for approval received in step 202 and providing the same to blockchain request approval system 105-1. Within system 105-1, an approver (which is represented by a device in the blockchain network) makes a decision regarding at least a portion of the request (such as one or more required sub-requests) in step 204, and correspondingly denies one or more sub-requests in step 206 and/or grants one or more sub-requests in step 208. In one or more embodiments of the invention, the decision in step 204 can be a time-bound transaction enabling certain types of decision to be made automatically.

Based on the step 206 and/or step 208 decisions, step 210 includes creating and/or implementing a new block in the blockchain network and correspondingly reducing a token from the blockchain network (wherein such actions can be carried out, for example, via block implementer 132 and cryptographic token manager 136 in the embodiment depicted in FIG. 1). In one or more embodiments of the invention, a new block will be created (via step 210) for any change (that is, either denial of a sub-request in step 206 or a granting of a sub-request in step 208), while a token will be reduced (via step 210) only when the request is approved (via step 208, for example). In case of a request denial (via step 206, for example), a new block will be created but a token will not be reduced.

As also illustrated in FIG. 2, one or more actions can subsequently be taken in step 212 to complete at least a portion of the account transaction with respect to system 105-1.

As detailed in FIG. 2 and elsewhere herein, an approval process can be based on a token mechanism to indicate one level of approval at a time. In at least one embodiment of the invention, the initial number of tokens within the blockchain network can be equivalent to the number of devices (approvers/accounts) required to complete the given approval process. Once any account has approved the request (or one or more sub-requests thereof), a communication will be broadcasted to all of the other devices (approvers), and one token will be reduced and/or removed from the blockchain network. By way of example, peer-to-peer (P2P) packages and/or remote procedure call mechanisms can be used to communicate between the devices in the blockchain network, and one or more protocols can be implemented to synchronize token counts across the devices.

In creating the block for the transaction in step 210, the device/system 105-1 can implement the block to include information including the decision(s) (approve in step 208 and/or reject in step 206), the multicast address of all of the other devices (approvers) in the blockchain network, a decision value, the current token count in the network, a block hash, etc. The communication subsequently sent to the other devices/systems in the blockchain network can also include a hash of a broadcasting device's identifying information.

As detailed herein, in one or more embodiments of the invention, a token will be elapsed/removed from the blockchain network in response to every accepted approval or sub-request approval (also, in conjunction with a new block being created in the blockchain network). Additionally, whenever any new block is created within the blockchain network, the new block gets approved by all participating devices/systems (approvers), rendering the transactions automatically secure and known to all participants. Further, once all of the tokens are exhausted from/within a given blockchain network, the approval phase is deemed completed for the corresponding approval request. Also, in accordance with one or more embodiments of the invention, block creation and token removal need not depend on or be carried out in any particular chronological sequence.

Figure 3:
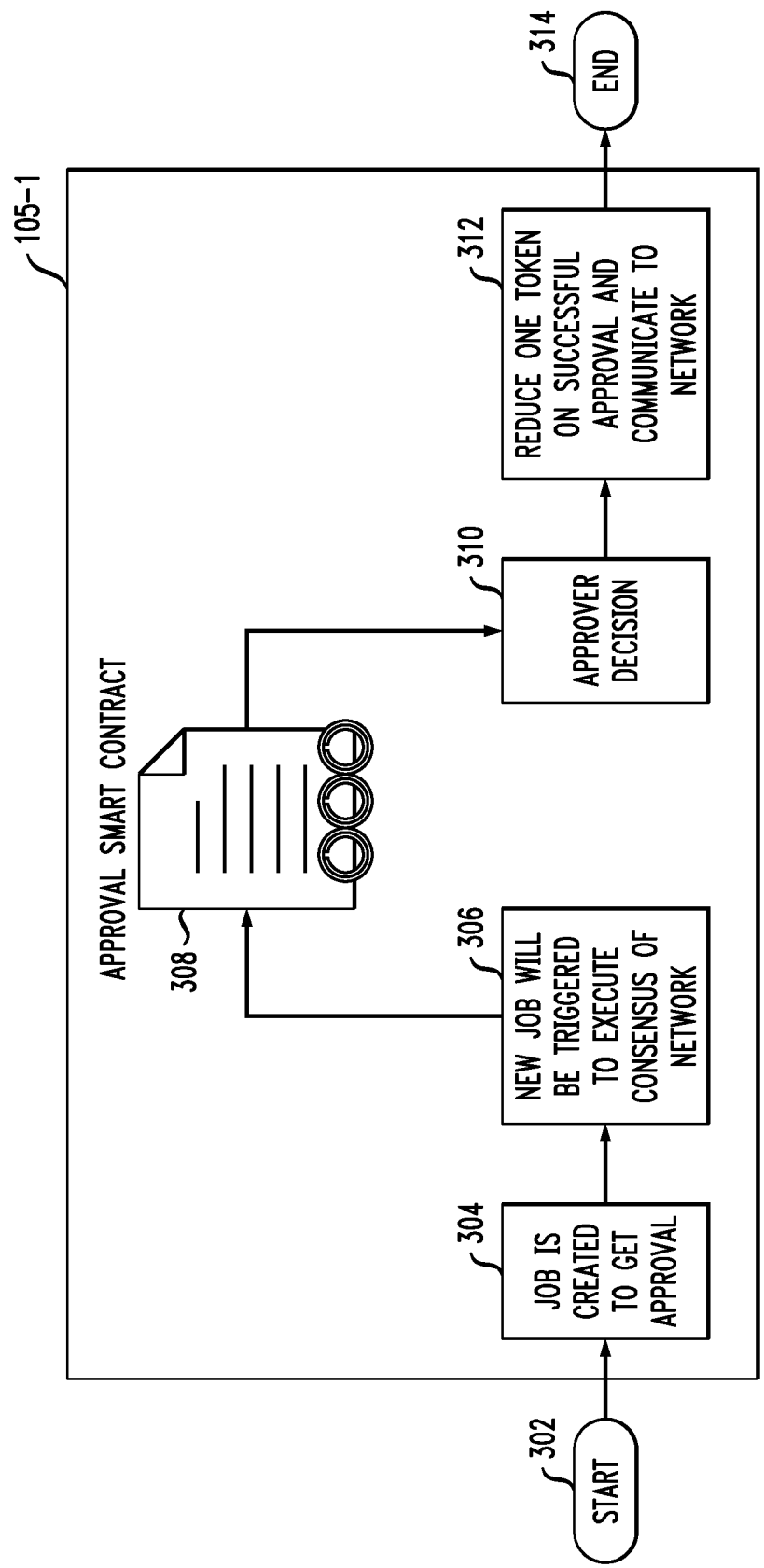
FIG. 3 shows example implementation of a smart contract in an illustrative embodiment of the invention.

FIG. 3 shows example implementation of a smart contract in an illustrative embodiment of the invention. By way of illustration, FIG. 3 depicts commencing a request approval transaction in step 302, and, via blockchain request approval system 105-1, steps 304 through 312 are carried out, prior to completing the transaction process in step 314. Specifically, step 304 includes creating a job for obtaining approval for a particular request (or one or more sub-requests), and step 306 includes triggering (in response to the newly-created job) execution of a consensus protocol among the devices/systems within the given blockchain network. Step 308 includes implementing a smart contract to determine if an automated approval process is enabled for the system 105-1. If such an automated approval process is indeed enabled, then step 308 can further include determining if a corresponding temporal bound approval is enabled, assessing one or more external dependencies, and assessing one or more network dependencies. Based on all such smart contract-related determinations, step 310 includes generating a system/approver decision, and step 312 includes, in response the decision generated via step 310, reducing/removing one token from the blockchain network and communicating the decision and token reduction to the other devices/systems within the blockchain network.

Figure 4:
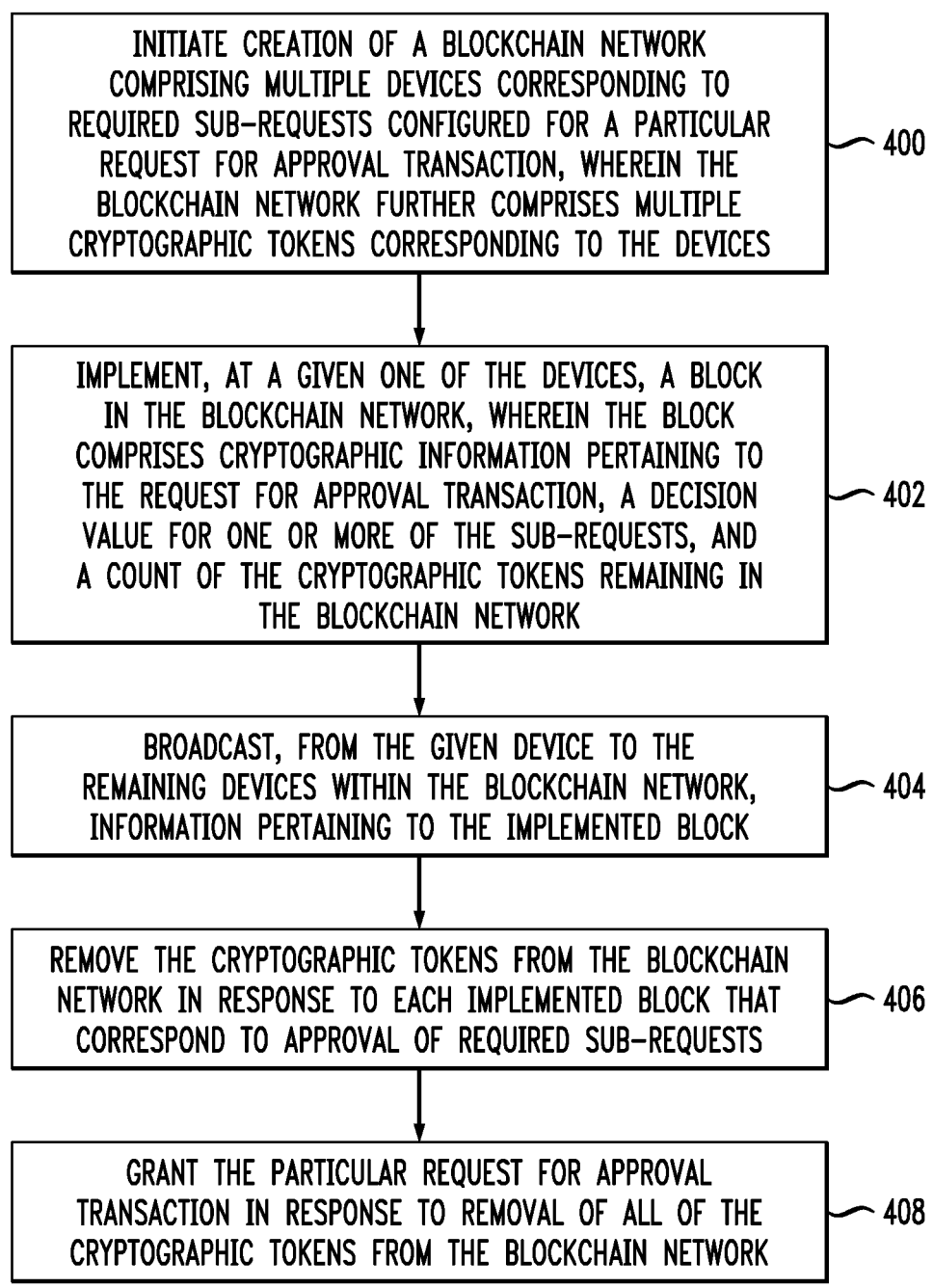
FIG. 4 is a flow diagram of a process for request approval using blockchain technology in an illustrative embodiment.

FIG. 4 is a flow diagram of a process for request approval using blockchain technology in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132, 134 and 136.

Step 400 includes initiating creation of a blockchain network comprising multiple devices corresponding to multiple required sub-requests configured for a particular request for approval transaction, wherein the blockchain network further comprises multiple cryptographic tokens corresponding to the multiple devices. Additionally, in one or more embodiments of the invention, the blockchain network is a private blockchain network.

Step 402 includes implementing, at a given one of the multiple devices, a distinct block in the blockchain network, wherein the implemented block comprises cryptographic information pertaining to the particular request for approval transaction, a decision value for one or more of the required sub-requests, and a count of the cryptographic tokens remaining in the blockchain network. The cryptographic information can include a cryptographic hash of one or more items of data associated with the particular request for approval transaction, broadcast addresses for all of the multiple devices within the blockchain network, etc.

Step 404 includes broadcasting, from the given device to the remaining devices within the blockchain network, information pertaining to the implemented block. Step 406 includes removing at least one of the cryptographic tokens from the blockchain network in response to each implemented block that corresponds to approval of a required sub-request. Additionally, at least one embodiment of the invention can also include synchronizing, across all implemented blocks, the count of the cryptographic tokens remaining in the blockchain network upon removal of at least one of the cryptographic tokens from the blockchain network.

Step 408 includes granting the particular request for approval transaction in response to removal of all of the cryptographic tokens from the blockchain network.

The techniques depicted in FIG. 4 can also include modifying the blockchain network in connection with a subsequent distinct request for approval transaction, wherein modifying the blockchain network can include adding one or more devices to the blockchain network and/or removing one or more devices from the blockchain network.

Further, at least one embodiment of the invention can also include generating a distinct smart contract for each of the multiple devices of the created blockchain network, wherein each smart contract includes a software protocol pertaining to carrying out at least a portion of the particular request for approval transaction. In such an embodiment, the software protocol can include one or more temporal parameters associated with the particular request for approval transaction and/or one or more dependencies associated with the particular request for approval transaction. Additionally, in such an embodiment, removing the at least one cryptographic token can include removing the at least one cryptographic token from the blockchain network upon execution of the smart contract for the given device.

Accordingly, the particular processing operations and other network functionality described in conjunction with the flow diagram of FIG. 4 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to authenticate approvers via other approvers using a private blockchain network. These and other embodiments can additionally implement a token mechanism to fulfill approval processes, and preclude a requirement that approvers authenticate in an identity governance and lifecycle system to prove identity.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
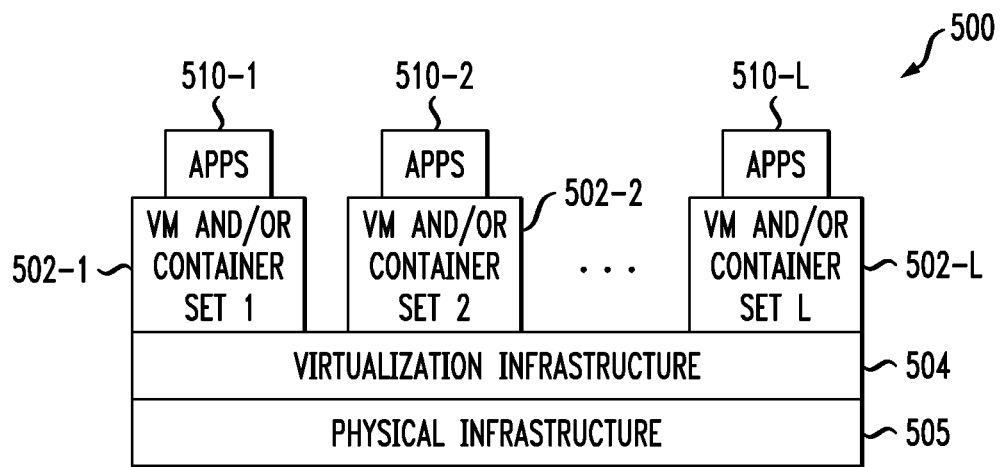
FIGS. 5 and 6 show examples of processing platforms that may be utilized to implement at least a portion of an information processing system in illustrative embodiments.
Figure 6:
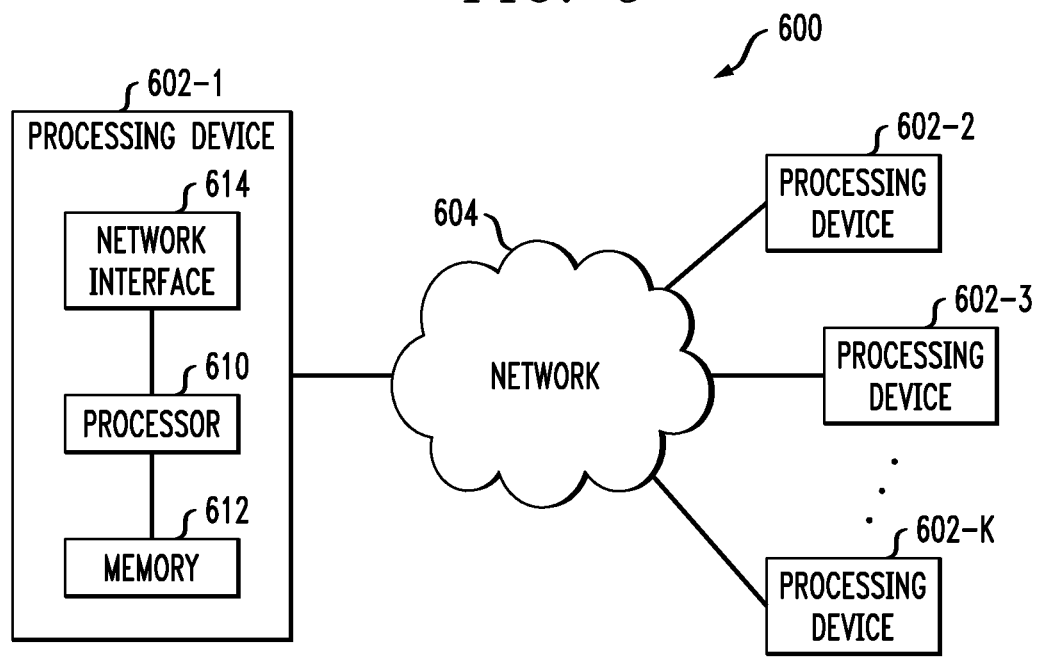

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide deduplication estimate generation functionality of the type described above for one or more processes running on a given one of the VMs. For example, each of the VMs can implement deduplication control logic and associated deduplication estimate tables for providing deduplication estimate generation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide deduplication estimate generation functionality of the type described above for one or more processes running on different ones of the containers. For example, a container host device supporting multiple containers of one or more container sets can implement one or more instances of deduplication control logic and associated deduplication estimate tables for use in generating deduplication estimates.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604 (for example, devices 602 cooperate via a consensus protocol over a blockchain network).

The network 604 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide secure request approval transactions. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   initiating creation of a blockchain network comprising multiple devices corresponding to multiple required sub-requests configured for a particular request for approval transaction, wherein the blockchain network further comprises multiple cryptographic tokens corresponding to the multiple devices;
   implementing, at a given one of the multiple devices, a distinct block in the blockchain network, wherein the distinct block comprises cryptographic information pertaining to the particular request for approval transaction, a decision value for one or more of the required sub-requests, and a count of the multiple cryptographic tokens remaining in the blockchain network;
   broadcasting, from the given one of the multiple devices to remaining devices of the multiple devices within the blockchain network, information pertaining to the distinct block;
   removing at least one of the multiple cryptographic tokens from the blockchain network in response to each implemented block that corresponds to approval of a required sub-request; and
   granting the particular request for approval transaction in response to removal of all of the multiple cryptographic tokens from the blockchain network;
   wherein the method is performed by at least one processing device comprising a processor coupled to a memory.

2. The computer-implemented method of claim 1, wherein the blockchain network comprises a private blockchain network.

3. The computer-implemented method of claim 1, further comprising:
   modifying the blockchain network in connection with a subsequent distinct request for approval transaction.

4. The computer-implemented method of claim 3, wherein modifying the blockchain network comprises adding one or more devices to the blockchain network.

5. The computer-implemented method of claim 3, wherein modifying the blockchain network comprises removing one or more devices from the blockchain network.

6. The computer-implemented method of claim 1, wherein the cryptographic information comprises a cryptographic hash of one or more items of data associated with the particular request for approval transaction.

7. The computer-implemented method of claim 1, wherein the cryptographic information comprises broadcast addresses for all of the multiple devices within the blockchain network.

8. The computer-implemented method of claim 1, further comprising:
   synchronizing, across all implemented blocks, the count of the multiple cryptographic tokens remaining in the blockchain network upon removal of at least one of the multiple cryptographic tokens from the blockchain network.

9. The computer-implemented method of claim 1, further comprising:
   generating a distinct smart contract for each of the multiple devices of the created blockchain network, wherein each smart contract comprises a software protocol pertaining to carrying out at least a portion of the particular request for approval transaction.

10. The computer-implemented method of claim 9, wherein the software protocol comprises one or more temporal parameters associated with the particular request for approval transaction.

11. The computer-implemented method of claim 9, wherein the software protocol comprises one or more dependencies associated with the particular request for approval transaction.

12. The computer-implemented method of claim 9, wherein removing the at least one cryptographic token comprises removing the at least one cryptographic token from the blockchain network upon execution of the smart contract for the given one of the multiple devices.

13. A non-transitory processor-readable storage medium having stored therein program code of one or more software programs, wherein the program code when executed by at least one processing device causes the at least one processing device:
   to initiate creation of a blockchain network comprising multiple devices corresponding to multiple required sub-requests configured for a particular request for approval transaction, wherein the blockchain network further comprises multiple cryptographic tokens corresponding to the multiple devices;
   to implement, at a given one of the multiple devices, a distinct block in the blockchain network, wherein the distinct block comprises cryptographic information pertaining to the particular request for approval transaction, a decision value for one or more of the required sub-requests, and a count of the multiple cryptographic tokens remaining in the blockchain network;
   to broadcast, from the given one of the multiple devices to remaining devices of the multiple devices within the blockchain network, information pertaining to the distinct block;
   to remove at least one of the multiple cryptographic tokens from the blockchain network in response to each implemented block that corresponds to approval of a required sub-request; and to grant the particular request for approval transaction in response to removal of all of the multiple cryptographic tokens from the blockchain network.

14. The non-transitory processor-readable storage medium of claim 13, wherein the program code when executed by the at least one processing device causes the at least one processing device:
to modify the blockchain network in connection with a subsequent distinct request for approval transaction.

15. The non-transitory processor-readable storage medium of claim 14, wherein modifying the blockchain network comprises at least one of adding one or more devices to the blockchain network and removing one or more devices from the blockchain network.

16. The non-transitory processor-readable storage medium of claim 13, wherein the program code when executed by the at least one processing device causes the at least one processing device:
to generate a distinct smart contract for each of the multiple devices of the created blockchain network, wherein each smart contract comprises a software protocol pertaining to carrying out at least a portion of the particular request for approval transaction.

17. An apparatus comprising:
at least one processing device comprising a processor coupled to a memory;
the at least one processing device being configured:
to initiate creation of a blockchain network comprising multiple devices corresponding to multiple required sub-requests configured for a particular request for approval transaction, wherein the blockchain network further comprises multiple cryptographic tokens corresponding to the multiple devices;
to implement, at a given one of the multiple devices, a distinct block in the blockchain network, wherein the distinct block comprises cryptographic information pertaining to the particular request for approval transaction, a decision value for one or more of the required sub-requests, and a count of the multiple cryptographic tokens remaining in the blockchain network;
to broadcast, from the given one of the multiple devices to remaining devices of the multiple devices within the blockchain network, information pertaining to the distinct block;
to remove at least one of the multiple cryptographic tokens from the blockchain network in response to each implemented block that corresponds to approval of a required sub-request; and
to grant the particular request for approval transaction in response to removal of all of the multiple cryptographic tokens from the blockchain network.

18. The apparatus of claim 17, wherein the at least one process device being further configured:
to modify the blockchain network in connection with a subsequent distinct request for approval transaction.

19. The apparatus of claim 18, wherein modifying the blockchain network comprises at least one of adding one or more devices to the blockchain network and removing one or more devices from the blockchain network.

20. The apparatus of claim 17, wherein the at least one process device being further configured:
to generate a distinct smart contract for each of the multiple devices of the created blockchain network, wherein each smart contract comprises a software protocol pertaining to carrying out at least a portion of the particular request for approval transaction.

\* \* \* \* \*